United States Patent [19]

Clemens et al.

[11] 3,930,117

[45] Dec. 30, 1975

[54] VIDEO CAPACITIVE DISC PLAYBACK APPARATUS AND STYLUS WITH DIELECTRIC COATING THEREFOR

[75] Inventors: Jon Kaufmann Clemens, Skillman; Richard Claxton Palmer, Blawenburg, both of N.J.

[73] Assignee: RCA Corporation, New York, N.Y.

[22] Filed: Nov. 14, 1974

[21] Appl. No.: 523,311

[52] U.S. Cl. 178/6.6 R; 179/100.1 B; 179/100.4 R; 179/100.41 G; 274/38; 358/8; 360/19

[51] Int. Cl.[2] .......... H04N 5/76

[58] Field of Search ........ 178/6.6 A, 6.6 R, 6.6 DD; 179/100.4 R, 100.4 M, 100.41 G, 100.1 B; 235/61.11 H; 274/38; 360/19; 358/4, 8

[56] References Cited

UNITED STATES PATENTS

| | | | |
|---|---|---|---|
| 3,783,196 | 1/1974 | Stanley | 179/100.1 B |
| 3,826,877 | 7/1974 | Leedom et al. | 179/100.1 B |
| 3,842,194 | 10/1974 | Clemens | 179/100.1 B |

*Primary Examiner*—Raymond F. Cardillo, Jr.
*Attorney, Agent, or Firm*—Eugene M. Whitacre; William H. Meagher

[57] ABSTRACT

A stylus support element of dielectric material (e.g., sapphire) has a tip formed with a tapering, flat rear face, having converging straight edges which terminate in a curved bottom edge. Sides of the support element tip extend in converging fashion toward a narrow stylus front, while a curved surface, extending forward from the bottom of the rear face with a gradually diminishing width, forms the bottom of the support element. The rear surface of the support element is coated with a thin layer of conductive material (e.g., hafnium) which forms a stylus electrode. Overlying the conductive layer is an additional layer of dielectric material (e.g., aluminum oxide) having a thickness which is large relative to the thickness of the conductive layer, but small relative to the length of the curved bottom of the stylus support element. In use of the stylus in video disc playback apparatus, the stylus tip is received in the groove of a disc having a conductive surface covered with a dielectric coating. As geometric variations of the groove bottom, representative of recorded picture and sound information, pass beneath the stylus, the capacitance between the stylus electrode and the disc's conductive layer varies. The capacitance variations are converted to electrical signal variations representative of the recorded information. Presence of the dielectric overcoating on the stylus electrode establishes a degree of symmetry for the stylus response, that eliminates or reduces spurious effects of sound interference with picture information that may be encountered in the absence of the overcoating use.

10 Claims, 4 Drawing Figures

Figure 1:
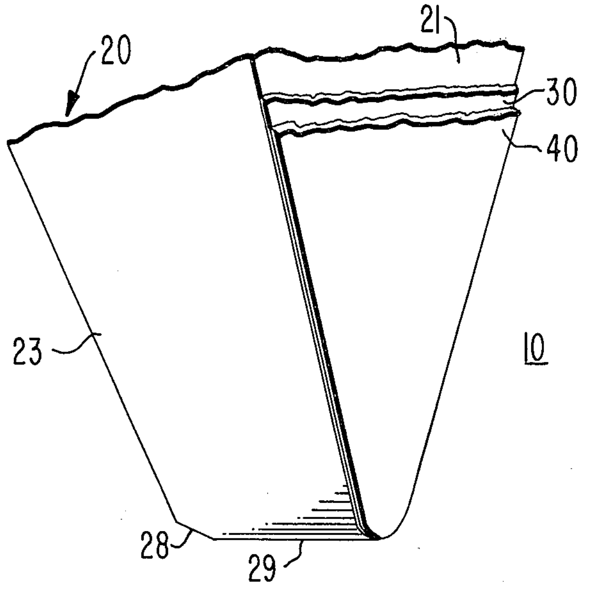

VIDEO CAPACITIVE DISC PLAYBACK APPARATUS AND STYLUS WITH DIELECTRIC COATING THEREFOR

This invention relates generally to novel playback apparatus for use in recovery of related picture and sound information from a disc record, and particularly to such apparatus employing novel playback stylus structure of a form aiding the prevention of deleterious sound interference in the reproduction of pictures from the recorded signals.

In U.S. Pat. No. 3,842,194, issued on Oct. 15, 1974 to Jon K. Clemens, video disc playback systems of a variable capacitance form are disclosed. In an arrangement therein disclosed, an information track incorporates geometric variations in the bottom of a spiral groove in a disc, the surface of which comprises conductive material covered with a thin coating of dielectric material. Variations in the capacitance presented between a conductive electrode on a tracking stylus and the conductive material of the disc occur as the disc is rotated by a supporting turntable; the capacitance variations are sensed to recover the recorded information.

In one particularly successful format employed for the groove bottom information track in practice of the Clemens invention, depressed areas extending across the groove bottom alternate with non-depressed areas, with the frequency of alternation varying with the amplitude of video signals subject to recording. The form of the recorded signal is thus a carrier frequency modulated in accordance with video signals. In a preferred technique for recording the information on a pregrooved video disc master, an electron beam subject to intensity modulation in accordance with FM carrier signals, impinges upon electron beam sensitive material in the master disc groove bottom, so that subsequent development leaves the desired relief pattern in the groove bottom. Reference may be made to the copending application of Loren B. Johnson, Ser. No. 335,024, filed Feb. 23, 1973 and entitled "Electron Beam Recording in Thick Materials", for a description of advantageous recording techniques that may be employed in such relief pattern development.

In the copending application of Eugene O. Keizer, Ser. No. 441,069, filed Feb. 11, 1974, now U.S. Pat. No. 3,911,476, recording techniques are disclosed for video discs of the aforementioned Clemens type whereby the recording of a composite color video signal with a sound accompaniment may be achieved advantageously. In disc recording apparatus as disclosed in the Keizer application, accompanying audio signals are caused to frequency modulate a low frequency sound carrier over a low frequency deviation range. The output of the sound carrier modulator is added to the output of a picture carrier modulator. In the picture carrier modulator, a composite color video signal (including luminance signals occupying a given band of frequencies, and chrominance signals appearing as sideband components of a modulated chrominance subcarrier interleaved with luminance signal components in an intermediate region of the given band) is caused to frequency modulate a high frequency picture carrier over a high frequency deviation range. The peak-to-peak amplitude of the sound modulator output is held at a level which is small relative to the peak-to-peak amplitude level of the picture modulator output. The resultant of combining the respective modulated carriers is applied of clipping means to develop an output which may be conveniently described as an impulse train having a repetition rate corresponding to the frequency of the frequency modulated picture carrier, and having a "duty cycle" which varies cyclically about a 0.5 value with the frequency of said cyclic variation of "duty cycle" corresponding to the frequency of the frequency modulated sound carrier.

The duty cycle modulated output of the clipping means is amplified and processed for application to suitable recording apparatus. Illustratively, the recording apparatus is of the SEM recorder type described in the aforementioned Clemens patent, with the intensity of the scanning electron beam controlled in response to the signal developed by the clipping means. As successive groove bottom regions of a grooved disc master, coated with a layer of electron beam sensitive material (forming a smoothly curved surface for the groove), pass through the electron beam path, the regions are exposed in a pattern determined by the intensity controlling signal such that, upon subsequent development, a pattern of geometry variations corresponding to the exposure pattern is established in the groove bottom of the disc master.

A stamper disc may be derived from the recording master, as by techniques described in the Clemens patent, and utilized, in conventional record stamping machinery, to produce a plurality of replica discs of thermoplastic material, each replica disc having a surface groove, in the bottom of which appears an information track comprising geometric variations in the pattern established in the groove bottom of the recording master. The grooved surface of each replica disc is then covered, as described, for example, in the Clemens patent, with a layer of conductive material and an outer coating of dielectric material overlying the conductive layer. The respective thicknesses are sufficiently small so that the conductive layer and overlying dielectric coating follow the contours of the groove and the groove bottom geometry variations therein.

Through application of the principles of the Keizer system to the recording process, as illustratively described above, the structure of each coated replica disc resulting therefrom is as follows: The groove bottom geometry variations comprise alternations between a first cross-sectional shape for the groove in which the coated groove bottom and adjacent coated groove walls define a continuous smooth curve, and a second cross-sectional shape in which the groove bottom is depressed relative to the groove bottom level associated with the first cross-sectional shape. The rate at which the alternations repeat along a given arcuate dimension of a groove convolution varies along the groove in accordance with the amplitude of a composite color video signal including components representative of the luminance and chrominance of the scanned image that has been subject to recording. The ratio of the longitudinal (along the groove) dimension of a depressed groove bottom region and the longitudinal dimension of an adjacent non-depressed groove bottom region varies along the groove in cyclical fashion about a value of unity. The rate at which the cyclic ratio variation repeats along a given arcuate dimension of a groove convolution varies in accordance with the amplitude of an audio signal representative of the recorded sound accompaniment for the recorded image-representative signals.

In a playback of a video disc replica embodying the aforementioned Keizer format under certain circumstances, sound interference in an image reproduction may be encountered that results in an undersired pattern display of possible distraction to the viewer. Particular instances of such sound interference occurrence have been observed to be the result of the interaction of certain record structure and pickup stylus response problems, as explained below.

In the practical use of electron beam recording of a grooved master disc coated with electron beam sensitive material in the manner described in the aforementioned Johnson application, the focused electron beam cross-section may have a non-ideal, graded (e.g., bell-shaped) distribution of electrons, with the result that an ideal information track geometry of undisturbed groove bottom areas interleaved with straight-edged pits is difficult to attain. Instead, the pits tend to have curved edges, and erosion of the groove bottom areas between successive pits is encountered.

When the spacing between successive pits is sufficiently small, overlapping erosion effects produce a reduction in the height of the intervening groove bottom area, a result hereinafter referred to as "signal track drop". When signal track drop is encountered, its severity (dependent upon the closeness of spacing of succesive pits) will vary directly with picture carrier frequency. Moreover, the signal track drop will vary in accordance with the low frequency sound carrier, when the duty cycle modulation approach described above is employed, since the duty cycle modulation alters the spacing between successive pits. The severity of the signal track drop will tend to increase in moving from the outermost convolution of the disc's spiral groove toward the innermost convolution, as diameter reduction results in closer spacing of successive signal elements representative of any particular instantaneous picture carrier frequency.

In playback of a video disc with groove regions exhibiting signal track drop, one of the results can be a variation in spacing between the stylus electrode bottom and the relatively non-depressed areas of the groove bottom passing beneath the stylus. The dielectric support portion of the stylus is desirably of considerably greater length (along the groove) than the conductive electrode portion. As a consequence, the location of the stylus electrode bottom is primarily determined by the height of the non-depressed groove bottom areas supporting the dielectric support portion. When signal track drop variations are encountered, differences in the height of the groove bottom beneath the respective stylus portions will result in the above-noted changes in the spacing between the stylus electrode bottom and the groove bottom.

One of the consequences of the above-noted spacing changes is that the signals recovered by sensing of the variations of the capacitance between the stylus electrode and the disc's conductive layer are subject to undesired amplitude modulation reflecting the signal track drop variations. However, the amplitude modulation effects are tolerable to a considerable degree without leading to troublesome sound interference with picture reproduction, because the player's picture FM demodulator, from which composite video signals are derived, is preceded by limiter circuitry which can effectively remove the spurious amplitude modulation of the recovered signals.

A more difficult problem is posed by the incidence of phase modulation of the recovered picture carrier signals in response to signal track drop variations. With phase modulation not subject to removal by the limiter circuitry, such spurious phase modulation reflecting the signal track drop variations can result in the player's picture FM demodulator developing a composite video signal including as an interfering component the low frequency FM sound carrier.

To appreciate one manner in which signal track drop variations can produce the aforementioned undesired phase modulation effects, it is necessary to consider the stylus structure and its electrical characteristics. In the previously mentioned Clemens patent, two alternative forms of stylus structure are disclosed: (1) a symmetrical structure, wherein the conductive stylus electrode is "sandwiched" between dielectric support material, which extends ahead of, and behind, the electrode in symmetrical fashion; and (2) an asymmetrical structure, wherein the stylus electrode comprises a conductive coating on the rear surface of a dielectric support.

The asymmetrical stylus form described above has proven to be convenient for ease in stylus fabrication. However, the material to the rear of the electrode of such an asymmetrical stylus, when in playback position in a rotating disc groove, consists of air, whereas the material in front of the electrode comprises the dielectric support material of the stylus. The support material typically has a dielectric constant appreciably different than the dielectric constant of air; when, for example, sapphire is employed as the stylus support material, its dielectric constant is approximately nine times as great as the dielectric constant of air.

Because of the noted dielectric constant difference, a given area of a disc groove's conductive layer at a given height and located just ahead of the electrode of the asymmetrical stylus will provide a greater contribution to the net electrode-to-disc capacitance than a comparable area of the disc's conductive layer at the same height located just behind the stylus electrode. When the stylus electrode bottom is quite close to the disc's conductive layer (as when the electrode is contacting a non-depressed area of the groove bottom) the aforesaid unequal forward and rearward contributions are dominated by a large contribution to the net electrode-disc capacitance determined by the conductive layer area directly beneath the stylus electrode. When the disc's conductive layer drops away from the stylus electrode bottom (as when the electrode is centered over a pit in the groove bottom), the directly-beneath area contribution drops away the most rapidly, and the relative significance of the forward contribution increases, with a consequent forward skewing of the stylus response.

In the absence of signal track drop variations, the above-noted forward skewing of stylus response attributable to stylus asymmetry is tolerable. While the center of a transition between maximum and minimum values for the electrode-disc capacitance will occur in advance of the centering of a pit edge beneath the stylus electrode, the degree of advance will be essentially constant. However, when signal track drop variations are present and cause variations in the spacing between the stylus electrode bottom and the groove bottom, the degree of advance will vary with such spacing variations. The timing of the capacitance transitions is thus affected by the signal track drop variations. Those signal track drop variations that follow the duty cycle modulation at sound carrier frequencies therefore can introduce phase modulation of the picture carrier at the sound carrier frequencies, with the result of undesired sound interference in the reproduced picture.

Pursuant to the principles of the present invention, the asymmetrical form of stylus disclosed in said Clemens patent is modified by the addition of an overcoating of dielectric material on the rear surface of the stylus. The thickness of the additional dielectric coating is large relative to the thickness of the underlying conductive electrode, but is small relative to the corresponding dimensions of the dielectric support to which the electrode is affixed. The dielectric constant of the material of the overcoating is significantly greater than the dielectric constant of air, and, in a preferred embodiment, is approximately equal to the dielectric constant of the material of the dielectric support.

A stylus of the above-described modified form, while still physically and mechanically asymmetrical, possesses sufficient symmetry of electrical properties to significantly reduce the above-discussed stylus response skewing otherwise associated with the asymmetrical stylus form. As a consequence, when a stylus of the above-described modified form is used for playback of a record subject to signal track drop variations, the introduction of phase modulation of the recovered picture carrier at the sound carrier frequencies is precluded to a substantial extent, whereby undesired sound interference in the reproduced picture is substantially avoided.

In accordance with an illustrative embodiment of the present invention a sapphire stylus support, having a longitudinal dimension, at the curved bottom of a groove-entering tip, of about 3 to 4 microns, has a rear surface coated (e.g., by use of suitable sputtering techniques) with a conductive layer of hafnium of a thickness of approximately 0.1 micron; the hafnium layer is, in turn, coated (e.g., also by sputtering) by a dielectric layer of aluminum oxide having a thickness in a range from approximately 0.7 micron to 1.0 micron. The hafnium and aluminum oxide layers are curved at their tips in a manner substantially matching the curving of the underlying support tip. Illustratively, the matching of the curving is effected by a finish lapping of the support with the respective layers affixed thereto.

Figure 2A:
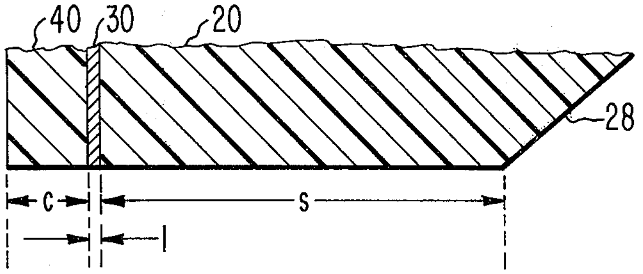
Figure 2B:
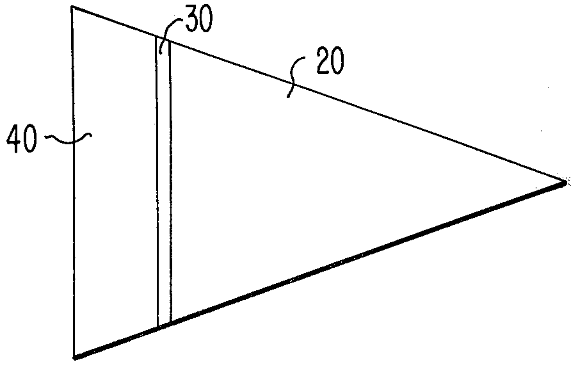
Figure 3:
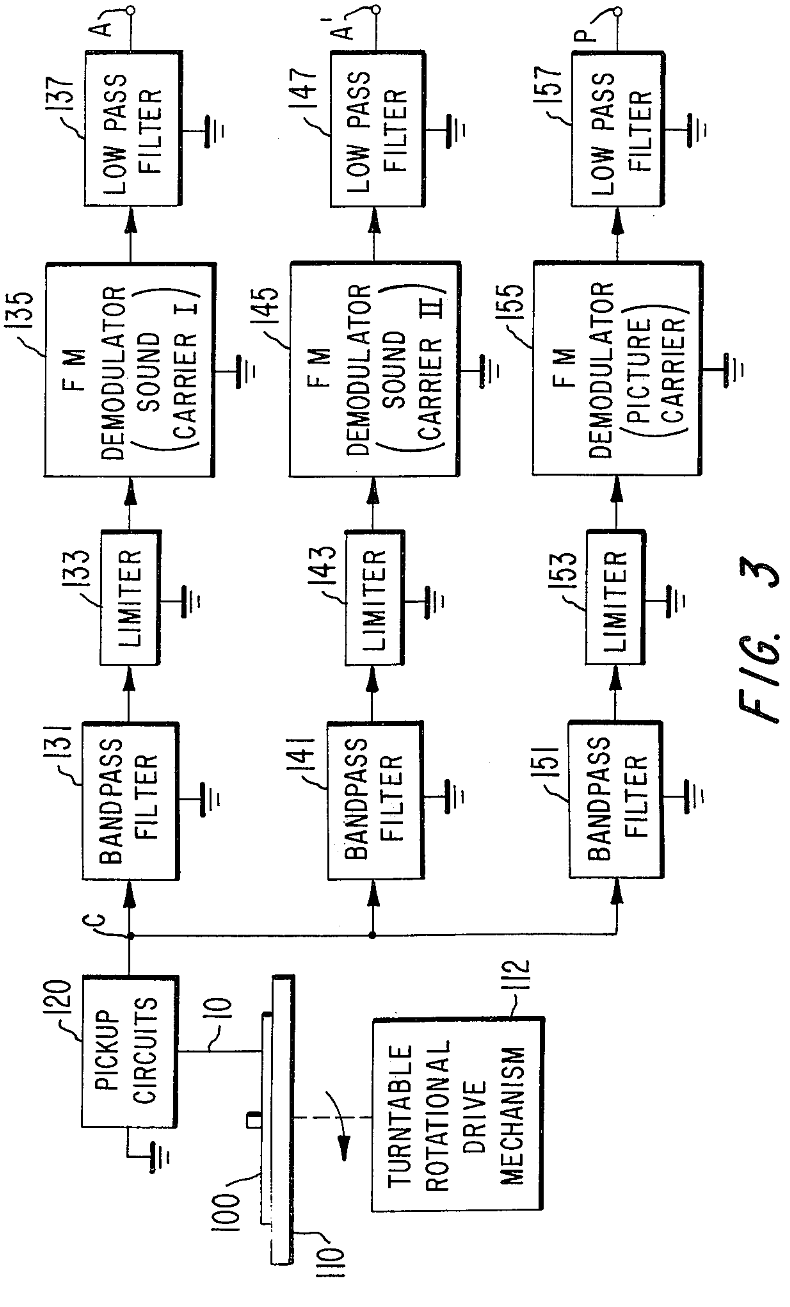

Objects and advantages of the present invention will be recognized by those skilled in the art upon a reading of the following detailed description and an inspection of the accompanying drawings wherein:

FIG. 1 illustrates a perspective view, partially broken away, of a tip of a playback stylus constructed in accordance with an embodiment of the present invention;

FIG. 2*a* illustrates a cross-sectional view of the bottom of the stylus tip of FIG. 1; FIG. 2*b* illustrates an outline bottom view of the curved bottom segments of the stylus tip of FIG. 1; and FIG. 3 illustrates, by blocking diagram representation, video disc playback apparatus in which the stylus of FIG. 1 is advantageously employed.

In FIG. 1, a perspective view of the tapered tip of a stylus 10 is shown. The stylus tip form shown in FIG. 1 represents a modification of the stylus tip form shown in FIG. 5 of the aforesaid Clemens patent, pursuant to the principles of the present invention. The modification centers on the use of a layer 40 of dielectric material, which overlies the (electrode-forming) conductive layer 30 adhering to the rear surface 21 of dielectric support element 20.

The illustrated tip of support element 20 has sides extending from rear surface 21 in converging fashion toward the stylus front; only one of the sides (23) is visible in the perspective view. The sides meet at the bottom of the stylus front to there define a knife edge 28. Above the knife edge 28, the converging sides terminate at the edges of a front face of triangular configuration (not visible in the perspective view). To the rear of knife edge 28, the support element bottom 29 is curved.

The tapering rear surface 21 of support 20 has converging straight edges which terminate in a curved bottom edge. Each of the respective layers 30 and 40 which overlie the surface 21 also has converging straight edges which terminate in a curved bottom edge.

FIG. 2*a* provides a cross-sectional view of the bottom of the stylus tip of FIG. 1, taken in the axial plane passing through knife edge 28. As shown in FIG. 2*a*, the length $c$ (along the curved bottom of the stylus tip) of the dielectric overcoating, as defined by the thicknesses of layer 40, is long relative to the bottom length ($l$) of the electrode, as defined by the thickness of the conductive layer 30, but is short relative to the bottom length ($s$) of support 20.

FIG. 2*b* provides an outline bottom view of the segmented, curved bottom of the stylus tip of FIG. 1. As FIG. 2*b* shows, the stylus "footprint" has a triangular outline, with the width of the curved bottom of the stylus tip decreasing rear-to-front, from a maximum width at the rear surface of layer 40 to a point at the beginning of the knife edge 28.

In an illustrative embodiment of the present invention the dielectric support element 20 is formed of sapphire with a dimension $s$ of between 3.0 and 4.0 microns, and the stylus electrode is formed by a conductive layer 30 of hafnium, having a thickness of approximately 1000 Angstrom units (i.e., 0.1 micron).. An acceptable degree of stylus response symmetrizing for a stylus of the aforesaid dimensions is realized with employment of an overcoating formed by a dielectric layer 40 of aluminum oxide, having a thickness in the range between approximately 0.7 micron and 1.0 micron.

In an illustrative manner of making styli of the above-described form, one major surface of a disc-shaped wafer of sapphire, having a thickness of 0.5 millimeter and a diameter of several (e.g., 2) centimeters is coated with a layer (0.1 micron thick) of hafnium by a sputtering process. The hafnium-coated surface of the wafer is in turn coated with a layer (0.7 to 1.0 micron thick) of aluminum oxide by a second sputtering process. The double-coated wafer is then diced to form a plurality of parallel-piped units, each having a length of 2.5 millimeters and a width of 0.4 millimeters, and a thickness defined by the double-coated wafer thickness. To form a stylus from one of the diced units, a first rough lapping step involves lapping of the narrow sides to form the front face, and the converging sides, of the stylus tip. With appropriate cocking of the unit during the side lapping, the converging sides form a knife edge angled across one end of the unit. In a finish lapping step, a portion of the knife edge is removed and supplanted by a curved bottom edge, with the curve defining an arc of a circle and chosen to substantially match the curvature of non-depressed regions of the groove bottom of the discs to be played.

In FIG. 3, a video disc record player, employing a stylus 10 of the form shown in FIG. 1, is illustrated. The player includes a turntable 110 upon which a video disc record 100 is supported for rotation at a substantially constant rate by a suitable turntable rotational drive mechanism 112.

The record 100 is of the general form described in the aforesaid Clemens patent, having a spirally grooved disc surface coated with successive layers of conductive and dielectric material. The groove bottom geometry variations which form the information track in the disc's spiral groove comprises alternations between a first cross-sectional shape in which the coated groove bottom and adjacent coated groove walls define a continuous smooth curve, and a second cross-sectional shape in which the groove bottom is depressed relative to the groove bottom level associated with the first cross-sectional shape. Pursuant to the format described in the aforesaid Keizer application, (1) the rate at which the alternations repeat along a given arcuate dimension of a groove convolution varies along the groove in accordance with composite video signal information, while (2) the ratio of the longitudinal dimension of a depressed groove bottom region and the longitudinal dimension of an adjacent non-depressed groove bottom region varies in response to information representative of a desired sound accompaniment. Illustratively, the sound accompaniment is of stereo form, and, pursuant to the approach described in our copending U.S. patent application, Ser. No. 522,811, filed Nov. 12, 1974, the aforesaid ratio variation occurs in response to the sum of two FM sound carriers having respectively different deviation ranges, of low frequencies relative to the deviation range frequencies associated with the aforesaid (picture-responsive) groove bottom shape alternations.

The tip of stylus 10 is received in the groove of rotating disc record 100, with the tip's curved bottom (substantially matching the curvature of the aforesaid continuous smooth curve normally engaging the coated surface of the relatively non-depressed regions of the groove bottom. The stylus-disc capacitance variations, developed as the groove bottom shape alternations pass beneath the stylus tip, are converted to electrical signal variations by pickup circuits 120 (coupled to the stylus electrode 30) in the manner generally described in the aforesaid Clemens patent. Reference may be made to the copending U.S. patent application of David J. Carlson, et al., Ser. No. 451,103, filed Mar. 14, 1974, now U.S. Pat. No. 3,872,240, for a description of an advantageous arrangement that may be employed for the pickup circuits 120.

The output of pickup circuits 120, developed at terminal C, is supplied to a trio of bandpass filters 131, 141 and 151. Bandpass filter 131 has a passband encompassing the relatively low frequency deviation range (and appropriate adjacent sidebands) of a first of the pair of recovered FM sound carriers. The output signal portion selectively passed by bandpass filter 131, subject to the limiting action of limiter 133, is supplied to a first sound carrier FM demodulator 135. The demodulator output, filtered by a lowpass filter 137, appears as a first audio signal output at terminal A.

Bandpass filter 141 has a passband encompassing the relatively low frequency deviation range (and appropriate adjacent sidebands) of the second FM sound carrier, and its output, subject to the limiting action of limiter 143, is delivered to a second sound carrier FM demodulator 145. This demodulator output, filtered by lowpass filter 147, appears as a second audio signal output at terminal A'.

Bandpass filter 151 has a passband encompassing the relatively high frequency deviation range (and appropriate adjacent sidebands) of the FM picture carrier. The high frequency output signal portion selectively passed by bandpass filter 151 is applied to limiter 153, which effectively removes spurious amplitude modulation of the recovered picture carrier waves. The output of limiter 153 is supplied to a picture carrier FM demodulator 155. A lowpass filter 157, responsive to the output of demodulator 155, develops composite video signals at terminal P.

With stylus 10 having the overcoated form of FIG. 1, there is relatively little of the previously discussed forward skewing of stylus response attributable to stylus asymmetry. With dielectric material having a dielectric constant greater than air to the rear of the stylus electrode 30 as well as the front thereof, electrical asymmetry is significantly reduced. This is particularly so when the dielectric constants of the materials of coating 40 and support element 20 are substantially equal (as in the illustrative embodiment's use of an aluminum oxide coating, and a sapphire support element-sapphire being a crystalline form of aluminum oxide). While some residual electrical asymmetry remains because of the shorter length of the coating, the effects are minor for the illustrative dimensions.

When the overcoated stylus 10 encounters signal track drop variations due to sound carrier duty cycle modulation in the groove of disc record 100, spurious amplitude modulation of the recovered picture carrier waves by sound carrier information may still result, but the recovered picture carrier waves are relatively free of spurious phase modulation thereby. With stripping of the spurious amplitude modulation conveniently effected by limiter 153, the composite video signals developed at terminal P are substantially free of sound carrier interference components.

Dielectric materials other than aluminum oxide may be employed for coating 40 with some degree of desirable symmetrizing of the stylus response. Two additional examples are Corning 7740 glass and Insotech IP-820 glass. The dielectric constant (4.5) of the 7740 glass differs sufficiently from sapphire's dielectric constant (approximately 9) that their use together provides less response symmetrization than the illustrative embodiment. This is less of a problem when the IP-820 glass is employed, because of the higher dielectric constant (8.3) of the IP-820 glass.

Another factor to be considered in choice of material for coating 40 is the degree to which its response to lapping matches the response thereto of the dielectric support element 20, since use of a common finish lapping step for all segments of the stylus is a desirable ingredient of the stylus fabrication process. An aluminum oxide coating forms an advantageous combination with a sapphire support element in this regard. Glass-sapphire combinations are less advantageous because of an apparent difference in wear rates for the respective materials.

Also to be considered in choice of material for coating 40 is the ability of the material to tenaciously adhere to the conductive layer 30. Satisfactory adherence of an aluminum oxide coating to a hafnium electrode has proven to be attainable.

It should be noted that the desired orientation of stylus 10 in the record groove during operation of the playback apparatus of FIG. 3 is such that (a) face 21 (FIG. 1) extends transverse to the groove, substantially perpendicular to the longitudinal axis of the groove at the point of signal pickup, and (b) the narrowed front of the stylus tip points in a direction opposite to the direction of groove motion.

It may also be noted that the thickness dimension for coating 40 is desirably large relative to the sum of the thickness of the disc's dielectric coating and the maximum signal track drop magnitude encountered along the disc groove's information track (with a typical value for said sum being of the order of 0.1 micron).

What is claimed is:

1. A stylus comprising, in combination:

a support element of dielectric material tapering to a tip at one end thereof and having a substantially flat face, said tip having a curved bottom surface of a given length terminating at said face;

a layer of conductive material of a given thickness adherent to said face; and a coating of dielectric material overlying said conductive layer and having a thickness which is large relative to the thickness of said conductive layer, and which is small relative to said given length of said curved bottom surface of said support element.

2. A stylus in accordance with claim 1 wherein the dielectric constant of said coating material is significantly greater than the dielectric constant of air.

3. A stylus in accordance with claim 1 wherein the dielectric constant of said coating material substantially matches the dielectric constant of said support element material.

4. A stylus in accordance with claim 1 wherein said support element is formed of sapphire and said coating comprises aluminum oxide.

5. A stylus in accordance with claim 4 wherein said conductive material comprises hafnium.

6. A stylus for use with a video disc record having a spiral groove containing geometric variations representative of recorded picture and sound information, with the bottom of said groove having recurring regions along its length exhibiting substantially the same curvature; said stylus comprising, in combination:

a support element of dielectric material tapering to a tip at one end thereof and having a substantially flat face, said tip having a curved bottom surface of a given length terminating at said face, said curved bottom surface having a curvature substantially corresponding to said curvature of said groove bottom regions;

a layer of conductive material of a given thickness adherent to said face; and a coating of dielectric material overlying said conductive layer and having a thickness which is large relative to the thickness of said conductive layer, and which is small relative to said given length of said curved bottom surface of said support element;

wherein both said layer and said coating have curved bottom edges with a curvature substantially corresponding to the curvature of said curved bottom surface of said support element.

7. A stylus in accordance with claim 6 wherein the width of said curved bottom surface decreases along its length in proportion to distance from said face.

8. A stylus in accordance with claim 6 wherein the dielectric constant of said coating material substantially matches the dielectric constant of said support element material, and wherein the width of said curved bottom edge of said coating exceeds the maximum width of said curved bottom surface of said support element.

9. In playback apparatus for use with a video disc record having a spiral groove containing an information track representative of recorded picture and sound information, the combination comprising:

1. a stylus including:
   a. a support element of dielectric material tapering to a tip at one end thereof and having a substantially flat face, said tip having a curved bottom surface of a given length terminating at said face, the width of said curved bottom surface decreasing along its length in proportion to distance from said face;
   b. a layer of conductive material of a given thickness adherent to said face; and
   c. a coating of dielectric material overlying said conductive layer and having a thickness which is larger relative to the thickness of said conductive layer, and which is small relative to said given length of said curved bottom surface of said support element;
2. a turntable for rotatably supporting said video disc record in a position permitting reception of said stylus support element tip in said spiral groove, with the direction of rotation of said turntable being such that successive regions of the successive convolutions of said spiral groove pass beneath said stylus support element, said conductive layer and said dielectric coating in the order named; and
3. circuit means electrically coupled to said conductive layer of said stylus for developing electrical signal variations representative of said recorded picture and sound information as said video disc record is rotated by said turntable.

10. A stylus in accordance with claim 9 wherein the dielectric constant of said coating material substantially matches the dielectric constant of said support element material, and wherein both said layer and said coating have curved bottom edges with a curvature substantially corresponding to the curvature of said curved bottom surface of said support element.

* * * * *